United States Patent
Takagi et al.

(10) Patent No.: US 11,436,740 B2
(45) Date of Patent: Sep. 6, 2022

(54) MANHOLE COVER ABNORMITY DETERMINATION APPARATUS, METHOD, AND COMPUTER READABLE MEDIUM

(71) Applicant: NIPPON TELEGRAPH AND TELEPHONE CORPORATION, Tokyo (JP)

(72) Inventors: Motohiro Takagi, Musashino (JP); Kazuya Hayase, Musashino (JP); Tokinobu Mitasaki, Musashino (JP); Atsushi Shimizu, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 98 days.

(21) Appl. No.: 16/971,762

(22) PCT Filed: Feb. 19, 2019

(86) PCT No.: PCT/JP2019/006105
§ 371 (c)(1),
(2) Date: Aug. 21, 2020

(87) PCT Pub. No.: WO2019/163776
PCT Pub. Date: Aug. 29, 2019

(65) Prior Publication Data
US 2021/0027474 A1    Jan. 28, 2021

(30) Foreign Application Priority Data
Feb. 26, 2018  (JP) .............................. JP2018-032432

(51) Int. Cl.
*G06T 7/246* (2017.01)
*E02D 29/14* (2006.01)

(52) U.S. Cl.
CPC .............. *G06T 7/246* (2017.01); *E02D 29/14* (2013.01); *G06T 2207/30184* (2013.01); *G06T 2207/30232* (2013.01)

(58) Field of Classification Search
CPC ..................... G06T 7/246; G06T 2207/30232; E02D 29/14
See application file for complete search history.

(56) References Cited

U.S. PATENT DOCUMENTS

| 2013/0103259 A1* | 4/2013 | Eng .................... B60G 17/0165 701/37 |
| 2015/0139546 A1 | 5/2015 | Sagawa et al. |

(Continued)

FOREIGN PATENT DOCUMENTS

| JP | 201599563 A | 5/2015 |
| JP | 201695235 A | 5/2016 |

OTHER PUBLICATIONS

Wei et al., "Customized Mobile LiDAR System for Manhole Cover Detection and Identification" (Year: 2019).*

(Continued)

*Primary Examiner* — Kenny A Cese

(57) ABSTRACT

An abnormality determination device includes: an analysis unit that analyzes at least a feature amount related to a pattern of a captured image of a manhole cover, the feature amount being included in coded information obtained by coding the captured image; and a determination unit that determines based on an analysis result of the analysis unit whether the manhole cover is abnormal.

9 Claims, 11 Drawing Sheets

(56) References Cited

U.S. PATENT DOCUMENTS

2017/0295372 A1* 10/2017 Lawrence ............ H04N 19/182
2018/0218596 A1*  8/2018 Castelli ............ G08G 1/096844

OTHER PUBLICATIONS

Timofte et al., "Multi-view Manhole Detection, Recognition, and 3D Localisation", IEEE (Year: 2011).*
Airec Engineering Corporation, "Stage Search 2." Step Search 2, Feb. 2, 2018 (Reading Day). <http://www.airec.co.jp/products/renovation/StepSearch2.html>. Machine translation attached.

* cited by examiner

MANHOLE COVER ABNORMITY DETERMINATION APPARATUS, METHOD, AND COMPUTER READABLE MEDIUM

CROSS-REFERENCE TO RELATED APPLICATIONS

This application is a 371 U.S. National Phase of International Application No. PCT/JP2019/006105, filed on Feb. 19, 2019, which claims priority to Japanese Application No. 2018-032432, filed on Feb. 26, 2018. The entire disclosures of the above applications are incorporated herein by reference.

TECHNICAL FIELD

The present invention relates to an abnormality determination device, an abnormality determination method, and an abnormality determination program.

BACKGROUND ART

In recent years, the need for automation of inspection and repair of social infrastructure has been increasing. For example, there is also a movement to automate inspection of telegraph poles and manholes as communication civil engineering facilities. For example, since manhole covers are often located on roads, it is necessary to inspect and repair regularly so as not to affect the passage of vehicles.

In the past, a worker approached a target manhole and measures or confirm a wear state of a cover or the like using, for example, a caliper. On the other hand, in recent years, a worker has determined an abnormality such as wear of a cover or rattling of the cover from a little distance, using an image of an installed manhole cover captured by a digital camera (see Non-Patent Literature 1, for example).

CITATION LIST

Non-Patent Literature

Non-Patent Literature 1: "Step Search 2", "online", Airec Engineering Corporation, [Search on Feb. 2, 2018], Internet (URL:http://www.airec.co.jp/products/renovation/StepSearc h2.html)

SUMMARY OF THE INVENTION

Technical Problem

In the technique disclosed in Non-Patent Literature 1, it is assumed that image information on a captured image of an installed manhole cover is coded and stored. Thus, it is assumed that the image is analyzed by decoding the image from the coded information and performing arithmetic processing to be performed on a general image such as feature extraction or discrimination for extracting features included in individual regions of the image. Therefore, as the number of target manholes increases, massive time costs may be required for the arithmetic processing.

In view of the above circumstances, the present invention is to provide a technique capable of reducing the time costs required for the arithmetic processing on the captured image of the manhole cover.

Means for Solving the Problem

An aspect of the present invention provides an abnormality determination device including: an analysis unit that analyzes at least a feature amount related to a pattern of a captured image of a manhole cover, the feature amount being included in coded information obtained by coding the captured image; and a determination unit that determines based on an analysis result of the analysis unit whether the manhole cover is abnormal.

In the abnormality determination device according to the aspect of the present invention, the feature amount is a code amount for each of division images obtained by dividing the image.

In the abnormality determination device according to the aspect of the present invention, the analysis unit analyzes the feature amount based on a distribution of the code amount.

In the abnormality determination device according to the aspect of the present invention, the distribution of the code amount is a histogram that defines the code amount as a variable amount and indicates a number of pieces of division image information that is information including the division images belonging to respective sections in which variable amount values are divided at predetermined constant intervals, the analysis unit calculates, as a determination score, a ratio between a number of pieces of the division image information including a minimum code amount in the section and a number of pieces of the division image information including the code amount equal to or more than a predetermined amount, based on the distribution of the code amount, and the determination unit determines, based on a predetermined threshold and the determination score, whether the manhole cover is abnormal.

In the abnormality determination device according to the aspect of the present invention, the abnormality is any one or more of wear of the manhole cover, water leakage, cracks, and a removal of the manhole cover.

In the abnormality determination device according to the aspect of the present invention, the image is an image of a desired subject with which the manhole cover is replaced.

An aspect of the present invention provides an abnormality determination method comprising steps of: analyzing at least a feature amount related to a pattern of a captured image of a manhole cover, the feature amount being included in coded information obtained by coding the captured image; and determining based on an analysis result obtained by the analyzing whether the manhole cover is abnormal.

An aspect of the present invention provides an abnormality determination program that causes a computer to function as the abnormality determination device described above.

Effects of the Invention

According to the present invention, it is possible to reduce time costs required for arithmetic processing on a captured image of a manhole cover.

DESCRIPTION OF EMBODIMENTS

Figure 1:
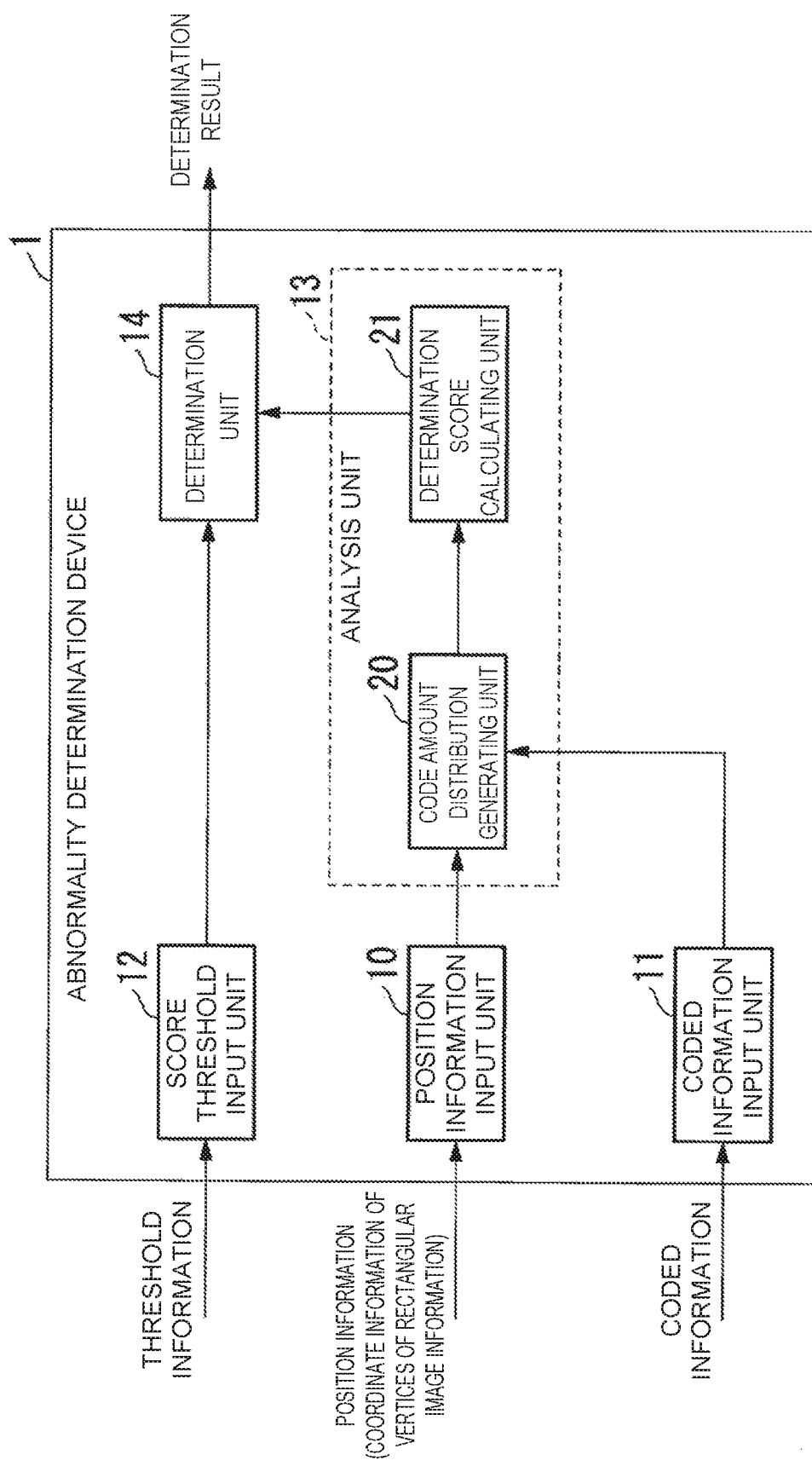
FIG. 1 is a block diagram showing a configuration of an abnormality determination device according to an embodiment to the present invention.

An embodiment of the present invention will be described below with reference to the drawings. FIG. 1 is a block diagram showing a configuration of an abnormality determination device 1 according to an embodiment of the present invention. The abnormality determination device 1 includes a position information input unit 10, a coded information input unit 11, a score threshold input unit 12, an analysis unit 13, and a determination unit 14.

Figure 2:
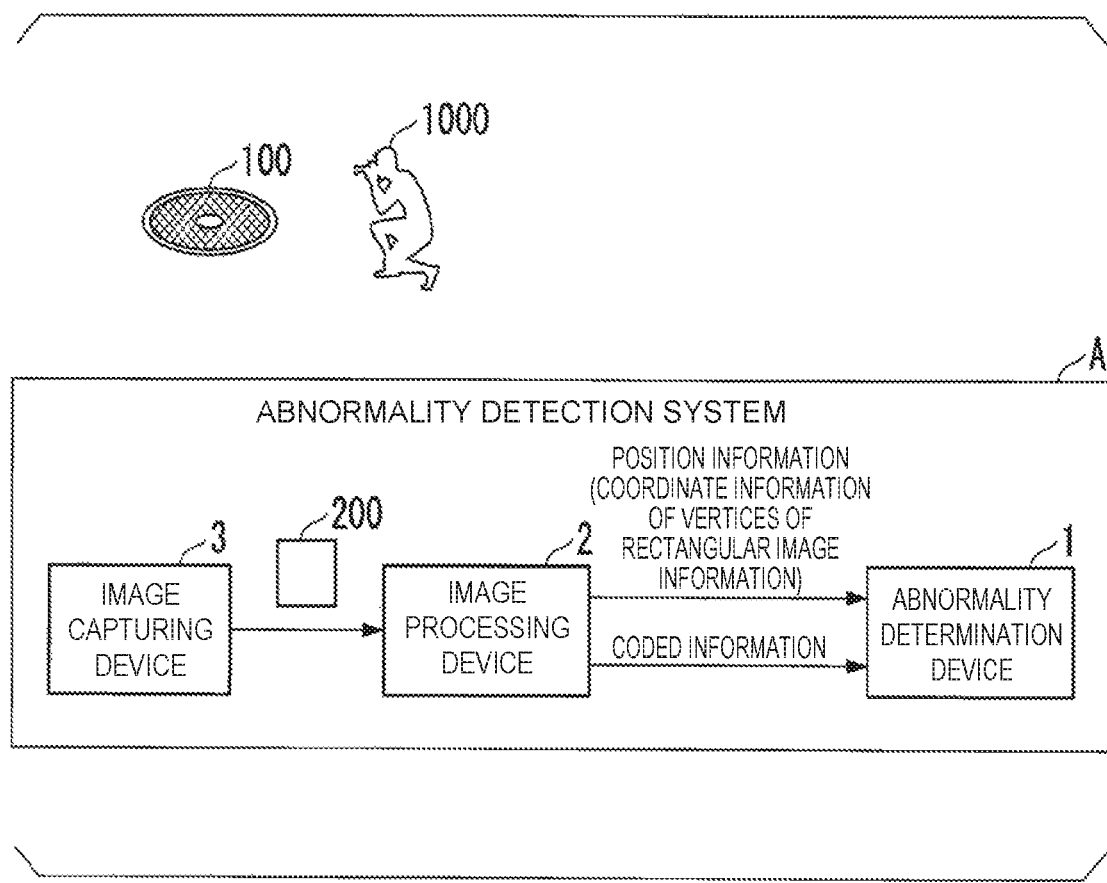
FIG. 2 is a block diagram showing a configuration of an abnormality detection system to which the abnormality determination device according to the embodiment is applied.

The abnormality determination device 1 is, for example, a device used for an abnormality detection system A that detects an abnormality of a manhole cover 100 as shown in FIG. 2. The abnormality detection system A includes an image capturing device 3, an image processing device 2, and an abnormality determination device 1. The abnormality detection system A is used as follows.

First, a worker 1000 using the abnormality detection system A captures a still image or the manhole cover 100, which is installed on a road, from a slightly distant position using the image capturing device 3 such as a digital camera. The worker 1000 connects the image capturing device 3 to the image processing device 2 after capturing the image. The image processing device 2 acquires captured image information 200 including the image of the manhole cover 100 captured from the connected image capturing device 3. The image of the manhole cover 100 included in the acquired captured image information 200 has an elliptical shape, for example, as shown in FIGS. 3(a) and 3(b) because of being captured from a slightly distant position. The images shown in FIGS. 3(a) and 3(b) are merely examples, and the image of the manhole cover 100 has various elliptical shapes including circles having the same major axis and minor axis, depending on capturing positions.

Figure 4:
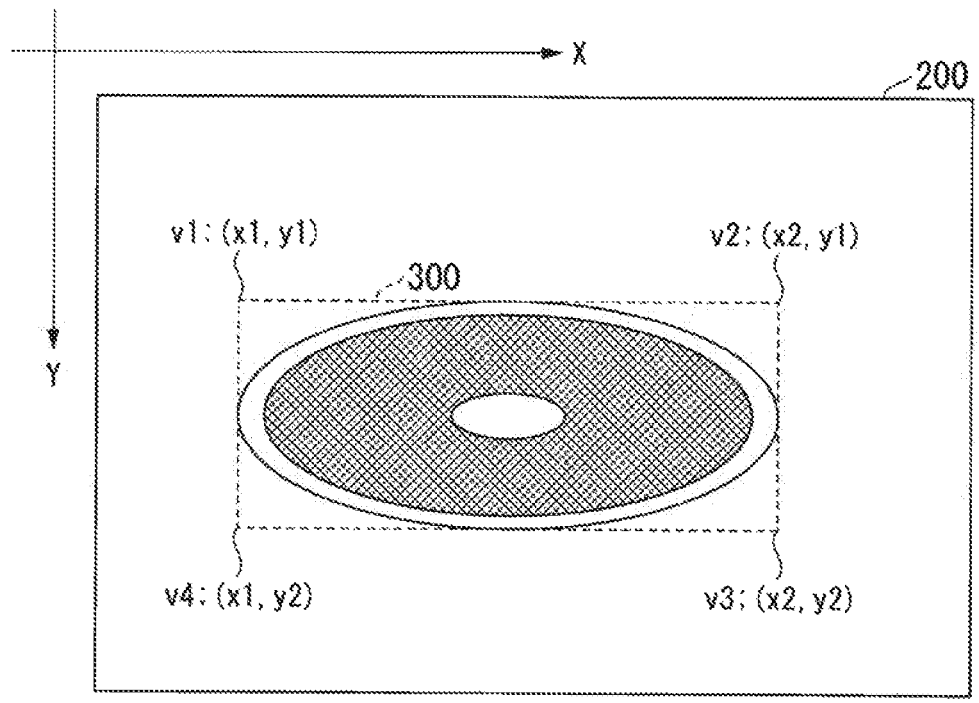
FIG. 4 is a diagram showing rectangular image information included in the captured image information captured by the image capturing device according to the embodiment.

The image processing device 2 performs image processing on the acquired captured image information 200, and, for example, as shown in FIG. 4, detects rectangular image information 300 of a rectangular area including the image of the manhole cover 100 from the captured image information 200. As shown in FIG. 4, the rectangular area is an area surrounded by a line segment being in contact with a circumference of the image of the elliptical manhole cover 100, a vertical length and a horizontal length of the rectangle are equal to the minor-axis length and the major-axis length of the ellipse, respectively.

The image processing device 2 detects coordinate information of four vertices v1, v2, v3, and v4 from the extracted rectangular image information 300, and detects the detected four coordinate information as position information in the captured image information 200 of the image of the manhole cover 100. Before detecting the coordinate information of the four vertices v1, v2, v3, and v4 from the rectangular image information 300, the image processing device 2 rotates the captured image information 200 to correct the position such that a vertical side of the rectangular image information 300 is parallel to a Y-axis and a horizontal side is parallel to an X-axis. Thus, the coordinate information of the four vertices v1, v2, v3, and v4 is obtained to have a relation as shown in FIG. 4.

Further, the image processing device 2 performs coding processing based on, for example, H. 265/HVEC (High Efficiency Video Coding) on the captured image information 200 whose position is corrected, and outputs coded information obtained by the coding processing. The coded information includes information on, for example, a code amount for each CU (Coding Unit), a CU size indicating a size of CU, an intra prediction mode applied to coding processing, the number of significant coefficients, and a bin of significant coefficients.

The CU described herein indicates, for example, division image information. 200-1-1, 200-1-2, 200-1-3, obtained by dividing the captured image information 200 into blocks having predetermined sizes as shown in FIG. 5(a). For example, when the CU size is set to a fixed size of 16×16 in a case where the captured image information 200 has pixels of 480×320, the number of CUs is 600 (=30×20). In this case, the image processing device 2 outputs information on 600 code amounts as a result of the coding processing.

Figure 5:
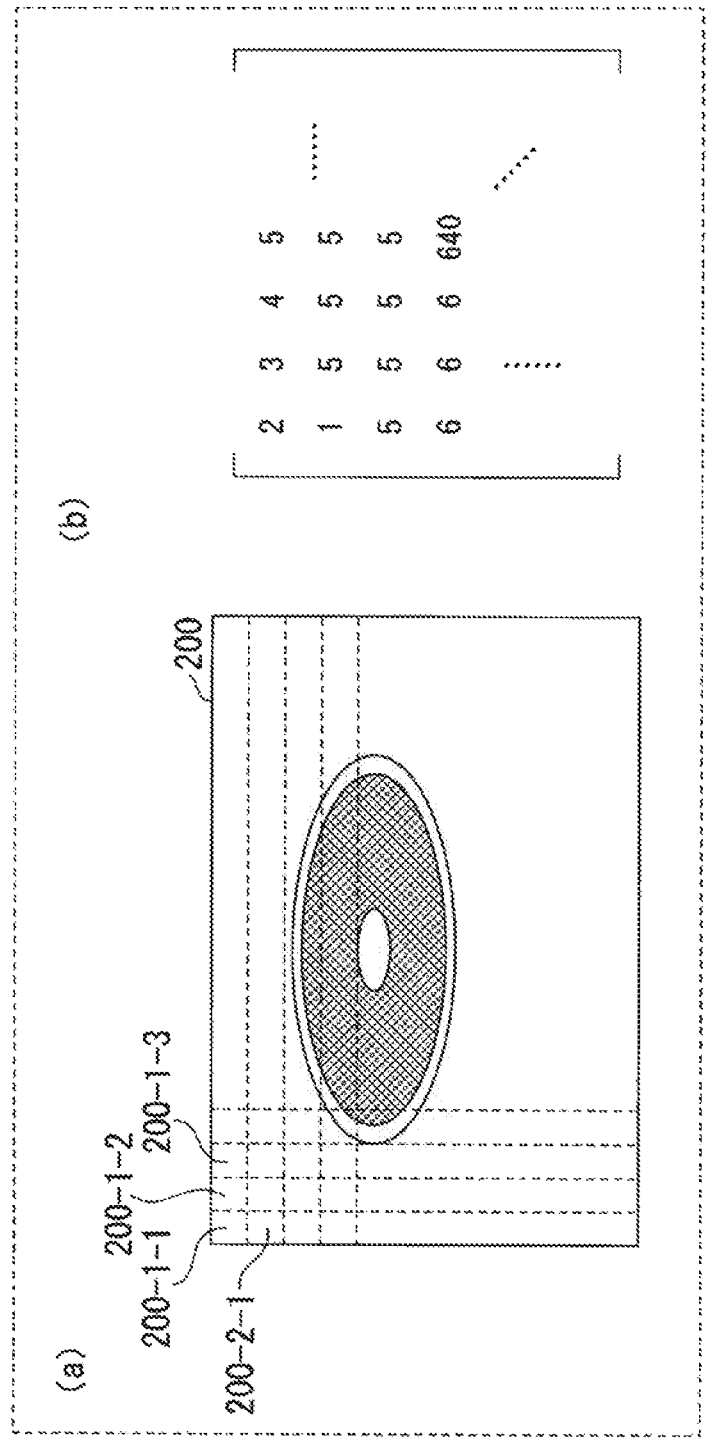
FIG. 5 is a diagram showing division of the captured image information and a two-dimensional matrix including a code amount for each division image information according to the embodiment.

When outputting the information on the code amount, the image processing device 2 outputs the information on the code amount in a two-dimensional matrix format as shown in FIG. 5(b). A relation between the division image information 200-1-1, 200-1-2, 200-1-3, . . . and each element of the two-dimensional matrix is as follow in an example shown in FIG. 5, for example; an element "2" of 1 row and 1 column in FIG. 5(b) corresponds to the code amount of the division image information. 200-1-1, an element "3" of 1 row and 2 columns corresponds to the code amount of the division image information 200-1-2, an element "4" of 1 row and 3 columns corresponds to the code amount of the division image information 200-1-3, and an element "1" of 2 rows and 1 column corresponds to the code amount of the division image information 200-2-1. In the following description, two-dimensional matrix information having the code amount for each CU as an element is referred to as a code amount matrix.

Returning to FIG. 1, the position information input unit 10 of the abnormality determination device 1 acquires the position information indicating the position of the manhole cover 100 in the captured image information 200 output by the image processing device 2, that is, acquires coordinate information of the four vertices of the rectangular image information 300. The position information input unit 10 outputs the coordinate information of the four vertices of the acquired rectangular image information 300 to a code amount distribution generating unit 20 of the analysis unit 13.

The coded information input unit 11 acquires the coded information output by the image processing device 2, and outputs the CU size information included in the acquired coded information and the code amount matrix to the code amount distribution generating unit 20 of the analysis unit 13.

The score threshold input unit 12 acquires threshold information used for determining a score given from the outside, and outputs the acquired threshold information to the determination unit 14.

The analysis unit 13 includes a code amount distribution generating unit 20 and a determination score calculating unit 21, and analyzes a feature amount related to a pattern of the image included in the captured image information 200. The present embodiment describes a case where a code amount is used as the feature amount, but any other feature amount may be used as long as the feature amount indicates a pattern of an image. The code amount distribution generating unit 20 generates information indicating a code amount distribution based on the coordinate information on the four vertices of the rectangular image information 300 output by the position information input unit 10 and the CU size and the code amount matrix output by the coded information input unit 11. The determination score calculating unit 21 calculates a determination score used for determining a wear state of the manhole cover 100 based on the information indicating the code amount distribution generated by the code amount distribution generating unit 20.

The determination unit 14 determines the score, which is calculated by the determination score calculating unit 21, using the threshold information output by the score threshold input unit 12, and determines whether the manhole cover 100 is abnormal.

Specifically, the determination unit 14 determines whether the manhole cover 100 is worn out.

(Processes by Abnormality Determination Device)

Figure 6:
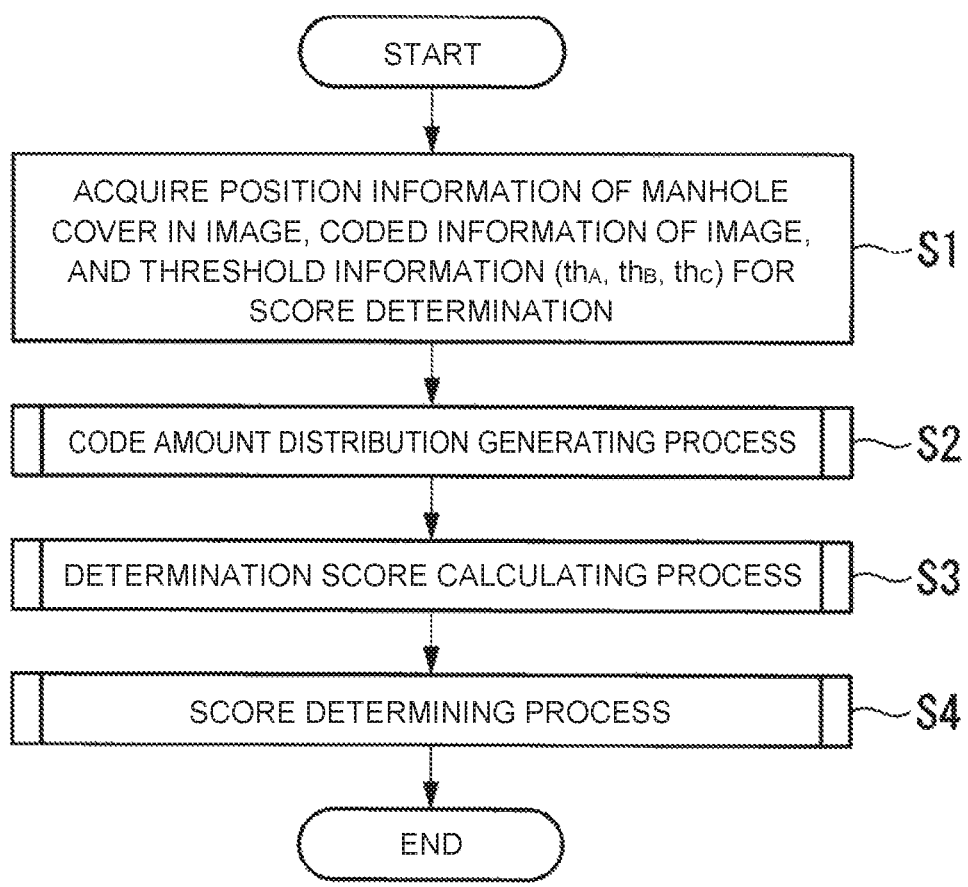
FIG. 6 is a flowchart showing a flow of processes to be performed by the abnormality determination device according to the embodiment.

A flow of processes performed by the abnormality determination device 1 will be described below with reference to FIGS. 6 to 11. FIG. 6 is a flowchart illustrating an overall flow of the processes performed by the abnormality determination device 1. The position information input unit 10 of the abnormality determination device 1 acquires the position information of the image of the manhole cover 100 in the captured image information 200 output by the image processing device 2, that is, the coordinate information of the four vertices of the rectangular image information 300. The position information input unit 10 outputs the acquired coordinate information of the four vertices of the rectangular image information 300 to the code amount distribution generating unit 20 of the analysis unit 13.

The coded information input unit 11 acquires the coded information output by the image processing device 2. The coded information input unit 11 outputs the CU size information and the code amount matrix included in the acquired coded information to the code amount distribution generating unit 20 of the analysis unit 13 (step S1).

Figure 7:
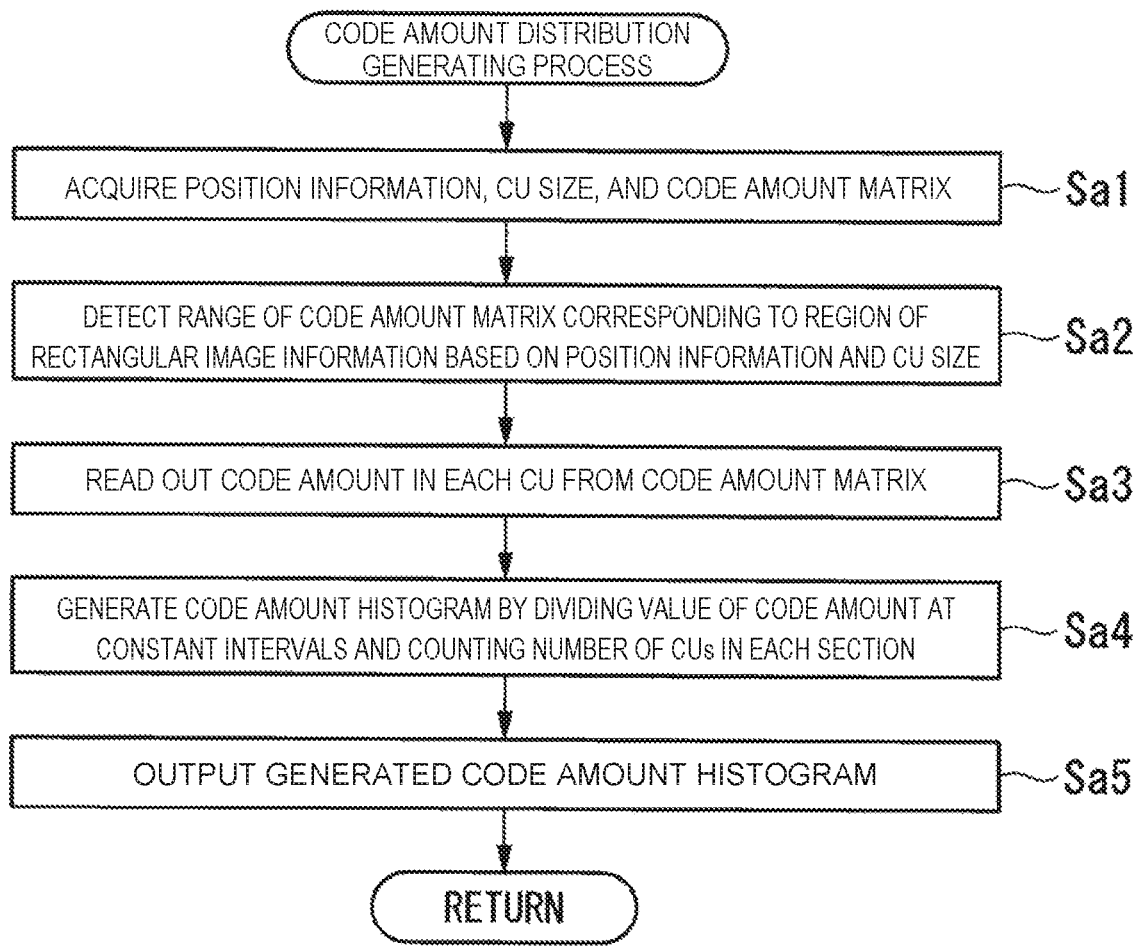
FIG. 7 is a flowchart showing a flow of a code amount distribution generating process according to the embodiment.

The code amount distribution generating unit 20 of the analysis unit 13 calls a subroutine shown in FIG. 7, and starts a process of generating a code amount distribution (step S2). The code amount distribution generating unit 20 acquires the coordinate information of the four vertices of the rectangular image information 300 output by the position information input unit 10 and the CU size information and the code amount matrix output by the coded information input unit 11 (step Sa1).

The code amount distribution generating unit 20 detects a range of the code amount matrix corresponding to a region of the rectangular image information 300 based on the coordinate information of the four vertices of the rectangular image information 300 and the CU size. For example, as shown in FIG. 8(*a*), the captured image information 200 has 480×320 pixels, and the pieces of coordinate information of the four vertices v1, v2, v3, and v4 of the rectangular image information 300 are (48, 32), (304, 32), (304, 176), and (48, 176), respectively.

Figure 8:
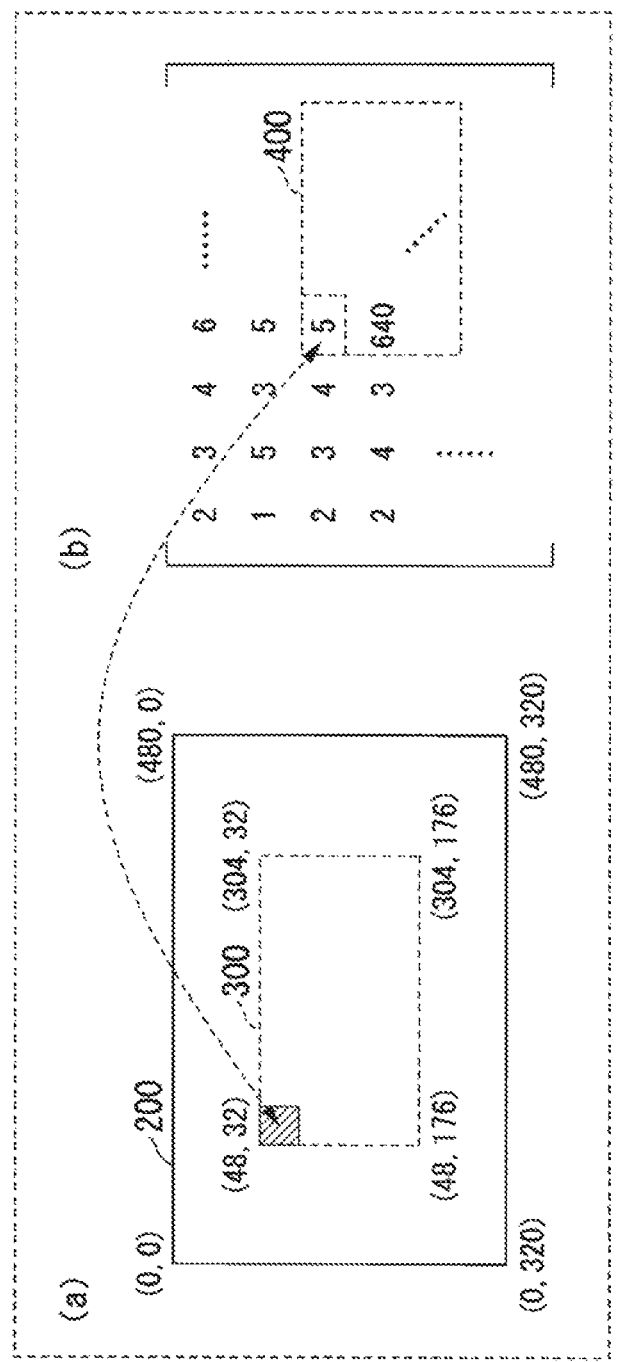
FIG. 8 is a diagram showing a correspondence relation between a region of the rectangular image information and a range of the two-dimensional matrix according to the embodiment.

Here, assuming that the CU size is 16×16, the entire size of the code amount matrix shown in FIG. 8(*b*) is 30 rows×20 columns because the size of the captured image information 200 is 480×320. The code amount distribution generating unit 20 divides X-coordinate values and Y-coordinate values included in the respective pieces of coordinate information of the four vertices v1, v2, v3, and v4 of the rectangular image information 300 by the CU size, thereby calculating quotient. In the example of FIG. 8(*a*), the code amount distribution generating unit 20 calculates four pieces of coordinate information (3, 2), (19, 2), (19, 11), and (3, 11) for the vertices v1, v2, v3, and v4, respectivly.

The coordinate information determined based on the quotient obtained by the division indicates the range of the code amount matrix corresponding to the region of the rectangular image information 300. However, since a coordinate system of the rectangular image information 300 has an origin point of (0, 0), the following numerical correction is required. For example, the position of the code amount matrix having the code amount of an upper left CU of the rectangular image information 300 as an element is (4, 3) obtained by adding "1" to respective coordinate values of (3, 2) corresponding to the vertex v1, that is a position of 4 rows and 3 columns in the code amount matrix. The remaining (19, 2), (19, 11), and (3, 11) are corrected to (19, 3), (19, 11), and (4, 11), respectively.

Therefore, the code amount distribution generating unit 20 detects a range 400 of 4 rows and 3 columns, 19 rows and 3 columns, 19 rows and 11 columns, 4 rows and 11 columns in the code amount matrix as a range of the code amount matrix corresponding to the rectangular image information 300 (step Sa2).

The code amount distribution generating unit 20 reads out the code amount for each CU from the range of the detected code amount matrix Sa3). The code amount distribution generating unit 20 generates a code amount histogram by defining the code amount as a variable amount of a histogram, dividing the range of the code amount value at predetermined constant intervals, and counting the number of CUs included in each of sections (step Sa4). In the following description, the section is called a bin.

Figure 9:
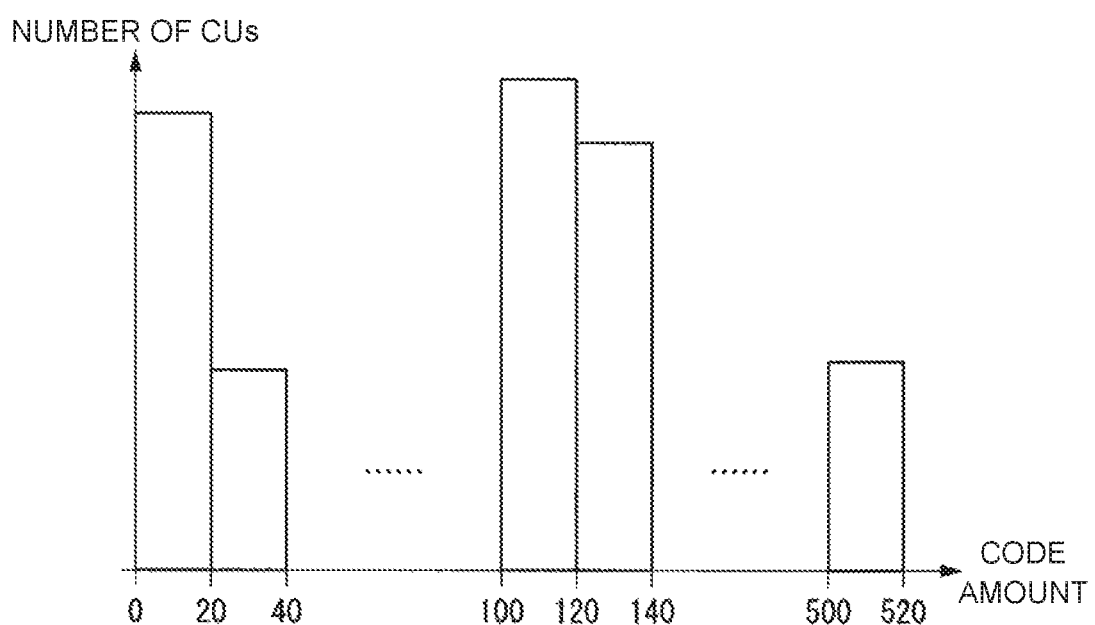
FIG. 9 is a diagram showing an example of a code amount histogram generated in the code amount distribution generating process according to the embodiment.

For example, FIG. 9 is a diagram showing, in a graph format, a code amount histogram generated by counting the number of CUs included in each bin with the size of the predetermined constant interval being "20". The code amount distribution generating unit 20 outputs the generated code amount histogram to the determination score calculating unit 21, and then the subroutine of the process of generating the code amount distribution is terminated (step Sa5).

Figure 10:
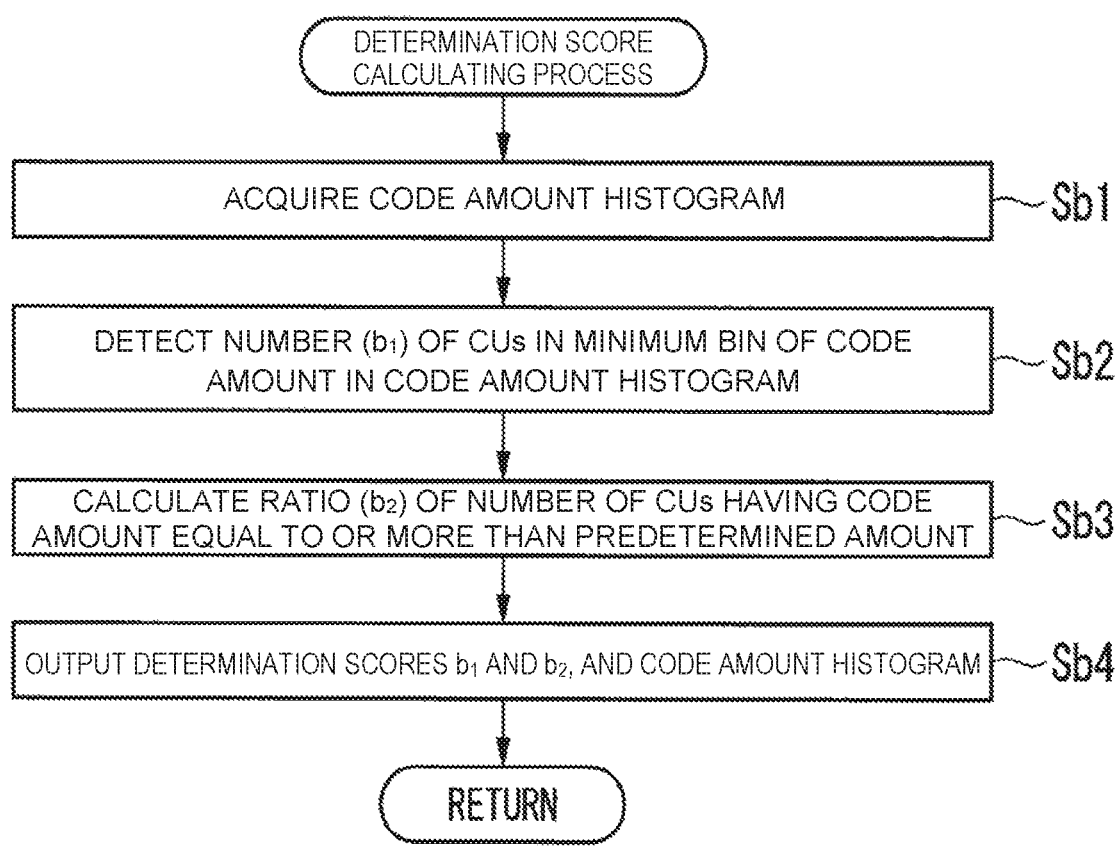
FIG. 10 is a flowchart showing a flow of a determination score calculating process according to the embodiment.

Returning to FIG. 6, the determination score calculating unit 21 of the analysis unit 13 calls a subroutine shown in FIG. 10, and starts a process of calculating a determination score used to determine the wear state of the manhole cover 100 (step S3).

The determination score calculating unit 21 acquires the code amount histogram output from the code amount distribution generating unit 20 (step Sb1). The determination score calculating unit 21 detects, as a determination score the number of CUs included in the minimum bin in the acquired code amount histogram (step Sb2). For example, in the example of FIG. 9, a range of the minimum bin is from "0" to "20", and the number of CUs included in such a minimum bin is detected as the determination score $b_1$.

The determination score calculating unit 21 calculates, as a determination score $b_2$, a ratio of the number of CUs having a code amount equal to or more than a predetermined amount in the code amount histogram (step Sb3). For example, in the example of FIG. 9, when the predetermined amount or more is "100", the determination score calculating unit 21 counts and calculates the number of all CUs having the code amount of "100" or more included in each of the bins. The determination score calculating unit 21 divides the calculated number of CUs having the code amount of "100" or more by the total number of CUs included in the code amount histogram, and calculates a ratio of the number of CUs having the code amount of "100" or more, the value of the calculated ratio being defined as the determination score $b_2$.

The determination score calculating unit 21 outputs the determination scores $b_1$ and $b_2$ and the code amount histogram to the determination unit 14, and thus the subroutine of the process of calculating the determination score is terminated (step Sb4).

Figure 11:
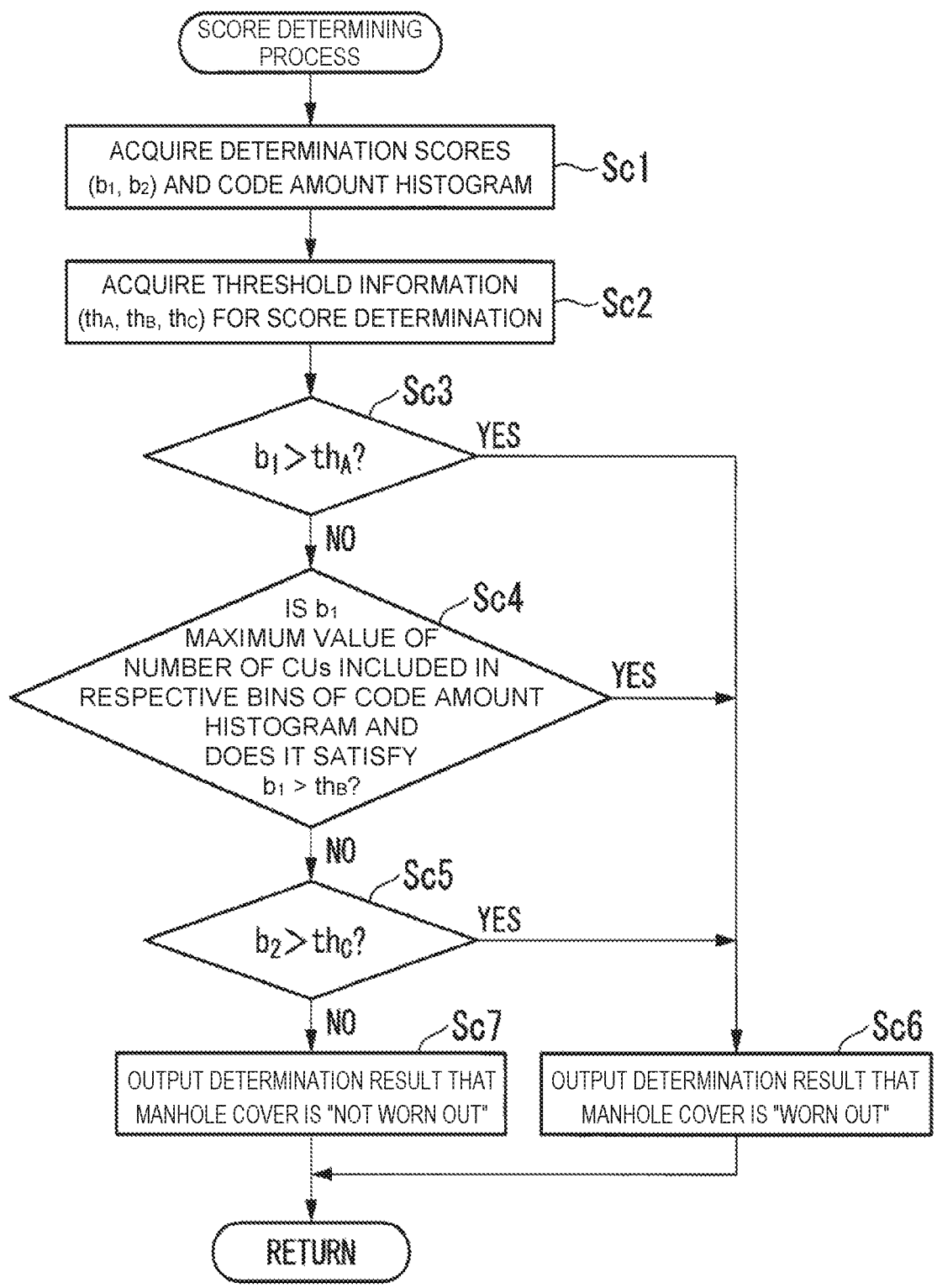
FIG. 11 is a flowchart showing a flow of a score determining process according to the embodiment.

Returning to FIG. 6, the determination unit 14 calls a subroutine shown in FIG. 11, and starts a score determining process of determining the determination scores $b_1$ and $b_2$ calculated by the determination score calculating unit 21, using the threshold information output by the score threshold input unit 12 (step S4). The determination unit 14 acquires the determination scores $b_1$ and $b_2$ and the code amount histogram output from the determination score calculating unit 21 (step Sc1).

The determination unit 14 acquires the threshold information output from the score threshold input unit 12, and reads out three thresholds $th_A$, $th_B$, and the included in the acquired threshold information (step Sc2). The sequence of the processes step Sc1 and step Sc2 may be changed.

Since the thresholds $th_A$ and $th_B$ are used for the determination of the determination score $b_1$, the thresholds $th_A$ and $th_B$ are values between a possible minimum code amount value and a possible maximum code amount value, and are predetermined to have a relation of threshold $th_A$>threshold $th_B$. In addition, since the threshold $th_C$; is used for the determination of the determination score $b_2$, a value indicating a percentage is predetermined.

The determination unit 14 determines whether the value of the determination score $b_1$ exceeds the threshold $th_A$ (step Sc3). When determining that the value of the determination score $b_1$ exceeds the threshold $th_A$ (step Sc3—YES), the determination unit 14 outputs a determination result that the manhole cover 100 is "worn out" (step Sc6).

On the other hand, when determining that the value of the determination score $b_1$ does not exceed the threshold $th_A$ (step Sc3—NO), the determination unit 14 then determines whether the value of the determination score $b_1$ is the maximum value of the number of CUs in the respective bins of the code amount histogram and the determination score $b_1$ exceeds the threshold $th_B$ (step Sc4). When determining that the value of the determination score $b_1$ is the maximum value of the number of CUs in the respective bins of the code amount histogram and the determination score $b_1$ exceeds the threshold $th_B$ (step Sc4—YES), the determination unit 14 outputs a determination result that the manhole cover 100 is "worn out" (step Sc6).

On the other hand, when determining that the value of the determination score $b_1$ is not the maximum value of the number of CUs in the respective bins of the code amount histogram or the determination score $b_1$ does not exceed the threshold the (step Sc4—NO), the determination unit 14 then determines whether the value of the determination score $b_2$ exceeds the threshold the (step Sc5).

When determining that the value of the determination score $b_2$ exceeds the threshold the (step Sc5—YES), the determination unit 14 outputs a determination result that the manhole cover 100 is "worn out" (step Sc6). On the other hand, when determining that the value of the determination score $b_2$ does not exceed the threshold the (step Sc5—NO), the determination unit 14 outputs a determination result that the manhole cover 100 is "not worn out" (step Sc7).

The three thresholds $th_A$, $th_B$, and the included in the threshold information will be described below. The determination score $b_1$ is the number of CUs included in the minimum bin in the code amount histogram, and a large number of CUs in the minimum bin means that many CUs having a small rode amount are present. The fact that many CUs having a small code amount are present means that a contrast among the feature amounts related to the pattern included in the rectangular image information 300 is low and that many textures showing a flat feeling are included.

For example, as shown in FIG. 3(b), when the surface of the manhole cover 100 is scraped and worn out, the contrast of the pattern is low and many textures showing a flat feeling are included. Accordingly, it is possible to determine whether the manhole cover 100 is worn out by determining based on the determination score $b_1$ whether many textures showing the flat feeling are included.

The threshold $th_A$ can be determined as follows. For example, a sample of the number of CUs in the minimum bin obtained from the rectangular image information 300 including the image of the obviously worn manhole cover 100 is acquired, and a sample of the number of CUs in the minimum bin obtained from the rectangular image information 300 including the image of the obviously unworn manhole cover 100 is acquired. A boundary value between the acquired samples is detected, and the boundary value or a value near the boundary value is determined as the threshold $th_A$.

The threshold $th_A$ is determined in this way, the determination process of step Sc3 is performed, and thus the worn manhole cover 100 can be extracted.

Further, when the determination score $b_1$ is the maximum value of the number of CUs in the respective bin of the code amount histogram, the entire distribution of the code amount is concentrated on the CU having the smaller code amount. Even in this case, it can be estimated that many textures showing a flat feeling as a whole are present. Accordingly, in order to extract the worn manhole cover 100 that cannot be extracted in step Sc3, the threshold $th_B$ satisfying the relation of threshold $th_A$>threshold $th_B$ is determined as described above, the determination process of step Sc4 is performed, and thus the worn manhole cover 100 can be extracted.

In other words, the determination process of step Sc3 can extract the manhole cover 100 having a higher degree of wear, whereas the determination process of step Sc4 can extract the manhole cover 100 that has a lower degree of wear than in step Sc3 but is more worn than the obviously unworn manhole cover 100.

The determination score $b_2$ indicates the ratio of the number of CUs having the code amount equal to or more than a predetermined amount, and when the value of the determination score $b_2$ is small, this means that the rectangular image information 300 does not include many CUs having a large code amount. Therefore, also in this case, since a large number of CUs having a smaller code amount are distributed, it can be estimated that many textures showing a flat feeling as a whole are present. Accordingly, the threshold $th_C$ is set to an appropriate value, and thus it is possible to extract the worn manhole cover 100 that cannot be extracted in step Sc3 or step Sc4.

In the configuration of the above-described embodiment, the analysis unit 13 of the abnormality determination device 1 analyzes the feature amount related to the pattern of the image, out of the coded information obtained by coding at least the captured image of the manhole cover 100. The determination unit 14 determines, based on the analysis result of the analysis unit 13, whether the manhole cover 100 has an abnormality. Thus, the abnormal state, that is, the wear state of the cover is determined from the coded information of the captured image of the manhole cover without using a general image feature extracting process, and thus time costs can be reduced.

In the configuration of the above-described embodiment, the coded information includes, for example, the code amount for each CU (Coding Unit), the CU size, the intra prediction mode, the number of significant coefficients, and the bin of significant coefficients, but, the present invention is not limited to the configuration of the embodiment. The coded information may be information including either or both of information that can directly be obtained from coded data of the captured image information 200 and information that can be obtained without performing at least the last one-step in a process of decoding coded data of the captured image information 200 into the captured image information 200 through multiple steps.

The above-described embodiment has the configuration in which the determination unit 14 determines the presence or absence of the abnormality of the manhole cover 100 by determining whether the manhole cover 100 is worn out, but may have a configuration in which the determination unit 14 determines the presence or absence of the abnormality of the manhole cover 100 by determining the presence or absence of water leakage, the presence or absence of cracks, or the presence or absence of removal of the manhole cover 100. When the presence or absence of water leakage is used as the determination of the presence or absence of abnormality of the manhole cover 100, the determination unit 14 determines that the manhole cover 100 is abnormal when the water leakage is present, and determines that the manhole cover 100 is not abnormal when the water leakage is absent. When the presence or absence of cracks is used as the determination of the presence or absence of abnormality of the manhole cover 100, the determination unit 14 determines that the manhole cover 100 is abnormal when the cracks are present in the manhole cover 100, and determines that the manhole cover 100 is not abnormal when the cracks are absent in the manhole cover 100. The cracks may be detected using an existing technique. When the presence or absence of removal of the manhole cover 100 is used as the determination of the presence or absence of abnormality of the manhole cover 100, the determination unit 14 determines that the manhole cover 100 is abnormal when the manhole cover 100 is removed, and determines that the manhole cover 100 is not abnormal when the manhole cover 100 is not removed. Whether the manhole cover 100 is removed may be determined by matching a captured image with an image in a state where the manhole cover 100 is not removed. The determination unit 14 may determine the presence or absence of abnormality of the manhole cover 100 by combining the examples described above. For example, determination unit 14 determines any one or more states of the presence or absence of wear of the manhole cover 100, the presence or absence of water leakage, the presence or absence of cracks, and the presence or absence of removal of the manhole cover 100, and may determine that the manhole cover 100 is not abnormal when all of the determined states or predetermined states are not abnormal.

In the above-described embodiment, the coordinate information of the four vertices of the rectangular image information 300 is given to the position information input unit 10 as the position information, but the configuration of the present invention is not limited to the embodiment. For example, the image processing device 2 may be configured to extract the rectangular image information 300 from the captured image information 200, generate a coding matrix by coding the extracted rectangular image information 300, and output coded information including the generated coding matrix to the abnormality determination device 1.

In this case, since the position information is not required, the position information input unit 10 does not need to be provided, and the code amount distribution generating unit 20 acquires only the code amount matrix in step Sa1 shown in FIG. 7, and can generate a code amount histogram by performing the process of step Sa3 and the subsequent processes without performing the process of step Sa2.

In the above-described embodiment, as shown in FIG. 4, the rectangular image information 300 having a rectangular shape including the image of the manhole cover 100 is extracted from the captured image information 200, and the wear state is determined using the code amount for each CU included in the extracted rectangular image information 300. However, the configuration of the present invention is not limited to the embodiment. As long as a method can specify the position of the image of the manhole cover 100, methods other than the method using the rectangular shape may be applied. In addition, since the manhole also has, for example, a quadrilateral shape in addition to the circular shape, the image processing device 2 may extract only the image of the manhole cover 100 depending on the shape of the manhole. In this case, the abnormality determination device 1 uses coded information related to image information including only the extracted image of the manhole cover 100. Even in this case, the configuration the same as in the case where the image processing device 2 extracts the rectangular image information 300. In other words, since the position information is not required, the position information input unit 10 does not need to be provided, and the code amount distribution generating unit 20 acquires only the code amount matrix in step Sa1 shown in FIG. 7, and can generate a code amount histogram by performing the process of step Sa3 and the subsequent processes without performing the process of step Sa2.

In the above-described embodiment, the captured image information 200 captured by the image capturing device 3 is a single still image as a premise, but may be a plurality of still image structures or moving image structures in which the positions of the manhole cover 100 are substantially coincide with each other. In this case, a plurality of pieces of code amount information corresponding respectively to the still images can be obtained for one Cu in the case of the plurality of still images, and a plurality of code amounts corresponding respectively to a plurality of frames in the moving image can be obtained for one CU in the case of the moving image. Therefore, the plurality of code amounts can be obtained for one CU, and the accuracy of wear determination can be improved.

In the case of the moving image, the code amount is designated by a bit rate. For example, when the code amount is 1500 kbps (bit per second) per second, a video of 30 fps (frame per second) has 50 kbps code amounts per frame on average, and a quantization coefficient is set so as to have such a code amount. In other words, as the designated bit rate change, the quantization coefficient also changes, so that characteristics of the code amount distribution also vary. Accordingly, the accuracy of wear determination can be improved in the case of the moving image by examining the bit rate, at which many CUs having a small code amount and often seen in the case of wear appear, in advance and capturing the moving image of the manhole cover 100 at the bit rate.

The above-described embodiment is configured to use the manhole cover 100 as a subject of the image capturing device 3 and to detect the wear state of the surface of the manhole cover 100, but the present invention is not limited to the embodiment. Any object may be used as a subject as long as the surface of the object is worn out by use, that is, edges on the image are distinguished and the edges gradually disappear. For example, a wear state of a grid pattern of the tire may be determined using the surface of the tire as a subject, and a wear state of the shoe sole may be determined using the shoe sole as a subject.

In the configuration of the above-described embodiment, the determination process is performed using the inequality sign in the processes indicated by step Sc3, Sc4, and Sc5 shown in FIG. 11. However, the present invention is not limited to the embodiment, the processes of determining "exceeding or not", "less than or not", "not less than or not", and "not more than or not" are merely examples, and may be replaced with processes of determining "not less than or not", "not more than or not", "exceeding or not", and "less than or not", respectively, depending on how to determine the threshold. In addition, the thresholds used in the determination processes are also examples, and different thresholds may be applied to the determination processes, respectively. In other words, whether the value to be determined is not less than the threshold may be determined in the threshold determining process.

Figure 3:
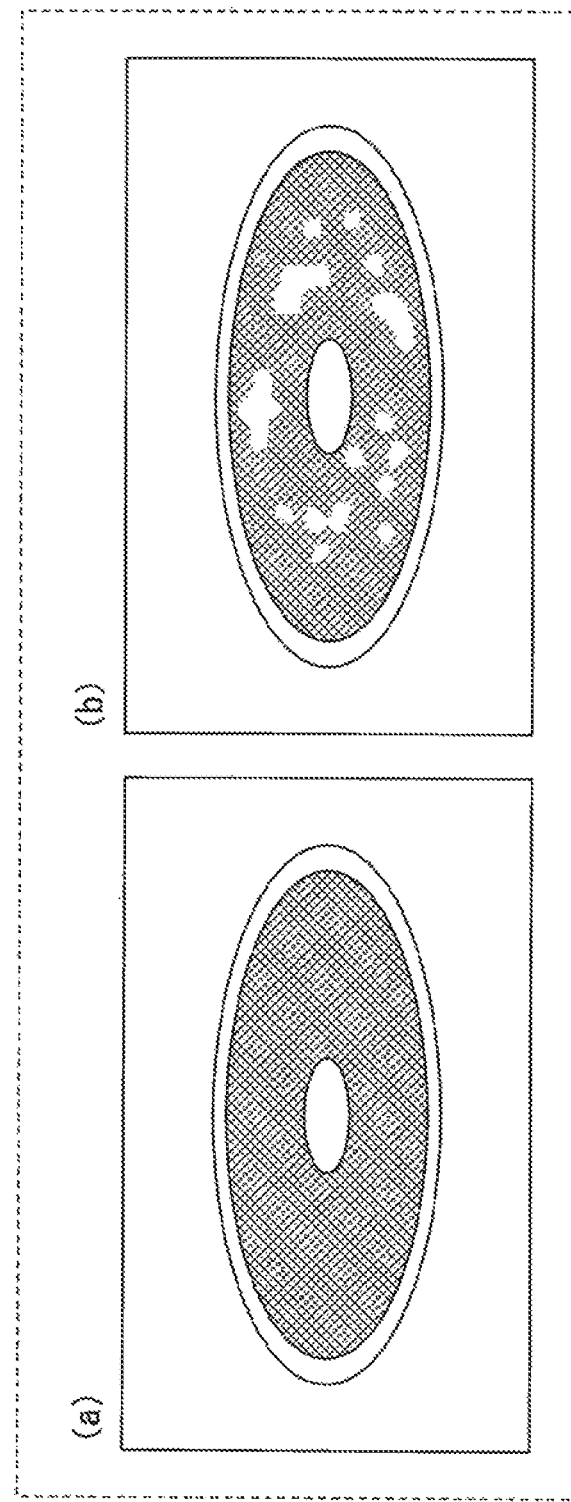
FIG. 3 is an example of captured image information including an image of a manhole cover captured by an image capturing device according to the embodiment.

Since the above-described embodiment is to detect the abnormality of the manhole cover 100 as shown in FIG. 3, it is assumed that the subject has a circular shape and the image of the manhole cover 100 has the elliptical shape, but the present invention is applicable to a square manhole cover and the like. In other words, the present invention can be applied to a subject whose presence or absence of the abnormality can be determined using, as a trigger, the fact that the edges of the image gradually disappear and become gradually clear.

In the above-described embodiment, the abnormality determination device 1 may be realized by a computer. In this case, a program for realizing the function may be recorded on a computer-readable recording medium, and the program recorded in the recording medium may be read and executed by a computer system. Here, the "computer system" includes an OS and hardware such as peripheral devices. Further, the "computer-readable recording medium." refers to a portable medium such as a flexible disk, a magneto-optical disc, a ROM, or a CD-ROM, or a storage device such as a hard disk incorporated in the computer system. Further, the "computer-readable recording medium" may also include a recording medium that dynamically holds a program for a short period of time, such as a communication line when the program is transmitted over a network such as the Internet or a communication line such as a telephone line, or a recording medium that holds a program for a certain period of time, such as a volatile memory inside a computer system serving as a server or a client in that case. Further, the above program may be a program for realizing some of the above-described functions, may be a program capable of realizing the above-described functions in combination with a program previously recorded in a computer system, and may be a program capable of being realized using a programmable logic device such as an FPGA (Field Programmable Gate Array).

Although the embodiment of the present invention has been described above in detail with reference to the drawings, specific configurations thereof are not limited to those of the embodiment and include designs or the like without departing from the gist of the present invention.

REFERENCE SIGNS LIST 1 abnormality determination device
10 Position information input unit
11 Coded information input unit
12 Analysis unit
13 Score threshold input unit
14 Determination unit
20 Code amount distribution generating unit
21 Determination score calculating unit

The invention claimed is:

1. An abnormality determination device comprising:
a processor; and
a storage medium having computer program instructions stored therein, when executed by the processor, perform to:
  receive coded information obtained by coding a captured image of a manhole cover;
  obtain a code amount of the coded information of each of division images obtained by dividing the captured image;
  generate a distribution of the code amount, the distribution of the code amount being obtained by defining the code amount as a variable amount and by sorting the division images in respective sections based on variable amount values of the division images, each of the respective sections having a corresponding value of the variable amount values, the variable amount values being divided at a predetermined constant interval to form the respective sections;
  calculate a determination score based on the distribution of the code amount; and
  determine an abnormality of the manhole cover based on the determination score,
wherein the distribution of the code amount is a histogram,
the processor is further configured to calculate a ratio between a number of the division images including a minimum code amount in the respective sections and a number of the division images including the code amount equal to or more than a predetermined amount in the respective sections based on the distribution of the code amount,
the determination score corresponds to the calculated ratio, and
the processor is configured to determine the abnormality of the manhole cover based on a predetermined threshold and the calculated ratio.

2. The abnormality determination device according to claim 1, wherein the abnormality is any one or more of wear of the manhole cover, water leakage, a crack, and a removal of the manhole cover.

3. The abnormality determination device according to claim 1, wherein the captured image is an image of a desired subject with which the manhole cover is replaced.

4. An abnormality determination method for causing a processor to execute a process, the method comprising executing on the processor the steps of:
   receiving coded information obtained by coding a captured image of a manhole cover;
   obtaining a code amount of the coded information of each of division images obtained by dividing the captured image;
   generating a distribution of the code amount, the distribution of the code amount being obtained by defining the code amount as a variable amount and by sorting the division images in respective sections based on variable amount values of the division images, each of the respective sections having a corresponding value of the variable amount values, the variable amount values being divided at a predetermined constant interval to form the respective sections;
   calculating a determination score based on the distribution of the code amount; and
   determining an abnormality of the manhole cover based on the determination score,
   wherein the distribution of the code amount is a histogram,
   the processor is further configured to calculate a ration between a number of the division images including a minimum code amount in the respective sections and a number of the division images including the code amount equal to or more than a predetermined amount in the respective sections based on the distribution of the code amount,
   the determination score corresponds to the calculated ratio, and
   the processor is configured to determine the abnormality of the manhole cover based on a predetermined threshold and the calculated ratio.

5. The abnormality determination method according to claim 4, wherein the abnormality is any one or more of wear of the manhole cover, water leakage, a crack, and a removal of the manhole cover.

6. The abnormality determination method according to claim 4, wherein the captured image is an image of a desired subject with which the manhole cover is replaced.

7. A non-transitory computer readable medium including instructions executable by one or more processors to:
   receive coded information obtained by coding a captured image of a manhole cover;
   obtain a code amount of the coded information of each of division images obtained by dividing the captured image;
   generate a distribution of the code amount, the distribution of the code amount being obtained by defining the code amount as a variable amount and by sorting the division images in respective sections based on variable amount values of the division images, each of the respective sections having a corresponding value of the variable amount values, the variable amount values being divided at a predetermined constant interval to form the respective sections;
   calculate a determination score based on the distribution of the code amount; and
   determine an abnormality of the manhole cover based on the determination score,
   wherein the distribution of the code amount is a histogram,
   the processor is further configured to calculate a ration between a number of the division images including a minimum code amount in the respective sections and a number of the division images including the code amount equal to or more than a predetermined amount in the respective sections based on the distribution of the code amount,
   the determination score corresponds to the calculated ratio, and
   the processor is configured to determine the abnormality of the manhole cover based on a predetermined threshold and the calculated ratio.

8. The non-transitory computer readable medium according to claim 7, wherein the abnormality is any one or more of wear of the manhole cover, water leakage, a crack, and a removal of the manhole cover.

9. The non-transitory computer readable medium according to claim 7, wherein the captured image is an image of a desired subject with which the manhole cover is replaced.

* * * * *